(12) United States Patent
Hoskinson et al.

(10) Patent No.: US 7,918,721 B2
(45) Date of Patent: Apr. 5, 2011

(54) METHODS OF SEPARATING PARTICULATE RESIDUE STREAMS

(75) Inventors: Reed L. Hoskinson, Rigby, ID (US); Kevin L. Kenney, Idaho Falls, ID (US); Christopher T. Wright, Idaho Falls, ID (US); J. Richard Hess, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 12/777,670

(22) Filed: May 11, 2010

(65) Prior Publication Data

US 2010/0222120 A1 Sep. 2, 2010

Related U.S. Application Data

(62) Division of application No. 11/536,076, filed on Sep. 28, 2006, now Pat. No. 7,744,450.

(51) Int. Cl.
A01F 12/44 (2006.01)
(52) U.S. Cl. .......................................... 460/84
(58) Field of Classification Search ............ 460/84, 460/98, 99, 111, 112, 901, 113, 119; 239/239, 239/650, 663, 682, 684, 667, 677, 661; 241/240, 241/241, 243
See application file for complete search history.

(56) References Cited

U.S. PATENT DOCUMENTS

| | | |
|---|---|---|
| 2,626,159 A | 1/1953 | Thompson |
| 2,708,582 A | 5/1955 | Adams |
| 3,071,246 A | 1/1963 | Schimke |
| 3,107,475 A | 10/1963 | Gustafson |
| 3,317,064 A | 5/1967 | Fingerut |
| 3,669,122 A | 6/1972 | Rowland-Hill |
| 3,721,075 A | 3/1973 | Weiberg |
| 3,833,006 A | 9/1974 | Temple |
| 4,250,897 A | 2/1981 | Glaser |
| 4,310,005 A | 1/1982 | De Busscher et al. |
| 4,465,082 A * | 8/1984 | Strubbe ..................... 460/98 |
| 4,489,734 A | 12/1984 | Van Overschelde |
| 4,617,942 A | 10/1986 | Garner |
| 4,711,253 A | 12/1987 | Anderson |
| 4,921,469 A | 5/1990 | Scharf |
| 5,021,030 A | 6/1991 | Halford et al. |
| 5,120,275 A | 6/1992 | Zacharias |
| 5,558,576 A * | 9/1996 | Meyers ..................... 460/99 |
| 5,569,081 A | 10/1996 | Baumgarten et al. |
| 5,797,793 A | 8/1998 | Matousek et al. |
| 5,941,768 A | 8/1999 | Flamme |
| 6,354,938 B1 | 3/2002 | Schrattenecker |
| 6,500,064 B1 | 12/2002 | Schrattenecker |
| 6,547,169 B1 | 4/2003 | Matousek et al. |
| 6,554,701 B1 | 4/2003 | Wolters |
| 6,598,812 B1 | 7/2003 | Matousek et al. |
| 6,656,038 B1 | 12/2003 | Persson |
| 7,063,613 B2 | 6/2006 | Weichholdt |

(Continued)

*Primary Examiner* — Árpád Fábián-Kovács
(74) *Attorney, Agent, or Firm* — TraskBritt

(57) ABSTRACT

A particulate residue separator and a method for separating a particulate residue stream may include an air plenum borne by a harvesting device, and have a first, intake end and a second, exhaust end; first and second particulate residue air streams that are formed by the harvesting device and that travel, at least in part, along the air plenum and in a direction of the second, exhaust end; and a baffle assembly that is located in partially occluding relation relative to the air plenum and that substantially separates the first and second particulate residue air streams.

7 Claims, 1 Drawing Sheet

U.S. PATENT DOCUMENTS

Figure 1:
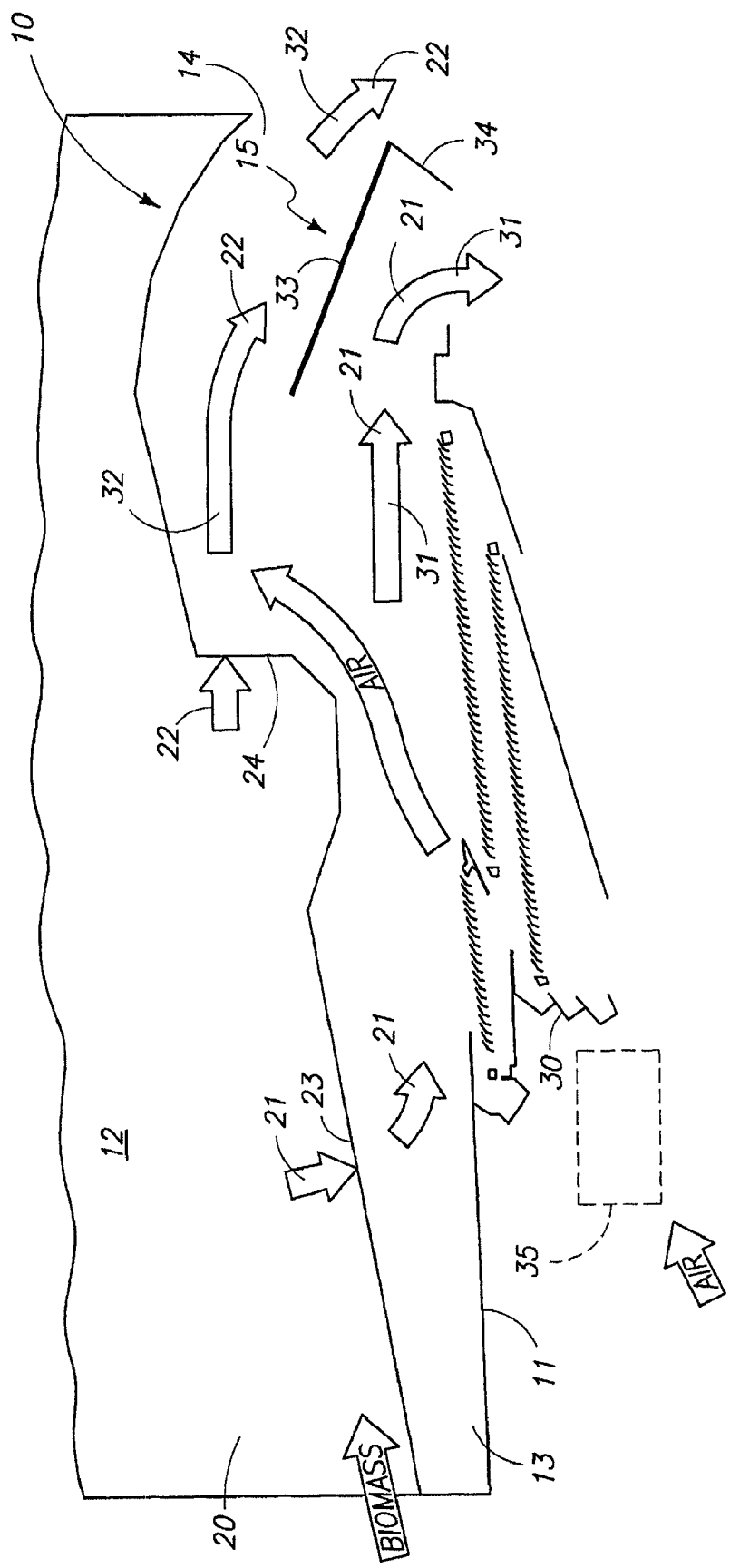

| | | |
|---|---|---|
| 7,066,810 B2 | 6/2006 | Farley et al. |
| 7,156,732 B2 | 1/2007 | Kuhn et al. |
| 7,381,130 B2 | 6/2008 | Smith |
| 7,455,584 B2 | 11/2008 | Farley et al. |
| 2003/0109294 A1 * | 6/2003 | Wolters et al. ................ 460/112 |
| 2003/0114207 A1 | 6/2003 | Wolters et al. |
| 2004/0092298 A1 | 5/2004 | Holmen |
| 2004/0137974 A1 | 7/2004 | Weichholdt |
| 2004/0242291 A1 | 12/2004 | Weichholdt |
| 2005/0124400 A1 * | 6/2005 | Schmidt et al. ................ 460/111 |

* cited by examiner

METHODS OF SEPARATING PARTICULATE RESIDUE STREAMS

CROSS-REFERENCE TO RELATION APPLICATION

This application is a divisional of U.S. patent application Ser. No. 11/536,076, filed Sep. 28, 2006, pending, the disclosure of which is hereby incorporated herein by this reference in its entirety.

GOVERNMENT RIGHTS

This invention was made with government support under Contract Number DE-AC07-05ID14517 awarded by the United States Department of Energy. The government has certain rights in the invention.

TECHNICAL FIELD

The present invention relates to a particulate residue separator and a method for separating a particulate residue stream, and more particularly to an apparatus and method that is useful for separating anatomical fractions in a biomass residue stream so as to produce resulting anatomical fractions that can be effectively utilized for various downstream purposes.

BACKGROUND OF THE INVENTION

Various studies have been conducted on assorted biomass fractionalization schemes in order to determine the feasibility of providing enhanced fractionalization for a biomass stream so as to produce anatomical fractions that might be useful in various downstream processes such as for producing enhanced animal feed; or further providing an anatomical fraction that can be used as a feedstock that could yield increased amounts of ethanol when supplied to a downstream fermentation process. For example, the University of Kentucky conducted a study that looked at the composition of corn and wheat stover using identical procedures. These studies showed that that the glucan and xylan sugar content variability can be greater than 10% for stover and cereal straw anatomical fractions. Further, lignin content variability between anatomical fractions can approach 6%. The compositional variability of these constituents between anatomical fractions is sometimes significant, and further has some degree of stable predictability. Consequently, these same materials could be exploited to improve a feedstock for a downstream fermentation process that has improved structural carbohydrate content. Those skilled in the art have long recognized that ethanol yields and fermentation processes are a function of the feedstock structural carbohydrate content.

In addition to the foregoing, recent studies have compared the response of the individual fractions of corn and wheat stover to various fermentation pretreatment schemes. These studies show that the anatomical fractions respond in a different manner to pretreatment. Further, some fractions do not need pretreatment, and for those that do, some respond better to pretreatment than others. Since pretreatment is currently the most expensive step in bioprocessing for the production of ethanol from a biomass, these studies suggest that it may be less expensive to produce ethanol from some fractions than others. In fact, an anatomical fraction that contains less digestible sugars than another, but whose sugars are more accessible and therefore easier to convert to ethanol, may be a more preferred fraction and considered a much higher quality feedstock.

A particulate residue separator and a method for separating particulate residue streams is the subject matter of the present application.

SUMMARY OF THE INVENTION

A first aspect of the present invention relates to a particulate residue separator for a harvesting device, which includes an air plenum borne by a harvesting device and having a first, intake end and a second, exhaust end; first and second particulate residue air streams, which are formed by the harvesting device and that travel, at least in part, along the air plenum in the direction of the second, exhaust end; and baffle, which is located in partially occluding relation relative to the air plenum and that substantially separates the first and second particulate residue air streams.

Another aspect of the present invention relates to a particulate residue separator for a harvesting device that includes a harvesting assembly, which performs a harvesting function and produces a particulate residue stream that has at least a first particulate residue fraction and a second particulate residue fraction as a result of the harvesting function; an air plenum borne by the harvesting assembly, which has a first, intake end, a second, exhaust end, and a length dimension; means borne by the harvesting assembly for forming and propelling the first and second particulate residue fractions into first and second particulate residue air streams, which travel, at least in part, along the air plenum in the direction of the second, exhaust end; and a baffle mounted within the air plenum and located at the second, exhaust end thereof, which has a length dimension that is less than about one-half the length dimension of the air plenum and that is further oriented relative to the air plenum such that it does not substantially impede the movement of the first and second particulate residue air streams while simultaneously maintaining the separation to the first and second particulate residue air streams at the second, exhaust end (i.e., a discharge end) of the air plenum, and further does not impede the harvesting function.

Another aspect of the present invention relates to a method for separating a particulate residue air stream, which includes the steps of providing a harvesting device that has an air plenum, wherein the air plenum has a first, intake end and a second, exhaust end; generating a first particulate residue air stream and a second particulate residue air stream within the air plenum that move in the direction of the second, exhaust end; and positioning a baffle near the second, exhaust end and within the air plenum so as to maintain the two particulate residue air streams substantially separated upon discharge from the air plenum.

Yet another aspect of the present invention relates to a method for separating particulate residue, which includes the steps of providing a crop to be harvested; providing a harvesting device that has at least one air plenum and that generates first and second particulate residue air streams, wherein the first and second particulate residue air streams each have a discrete particulate residue fraction, and wherein the air plenum has a first, intake end and a second, exhaust end; harvesting the crop with the harvesting device while simultaneously producing the first and second particulate residue fractions during the harvesting of the crop; propelling the respective first and second particulate residue fractions, at least in part, along the air plenum by means of the first and second particulate residue air streams and in the direction of the second, exhaust end; maintaining the separation of the first and second particulate residue air streams at the second, exhaust end of the air plenum; and collecting the respective particulate residue fractions from the first and second particulate residue air streams for further processing following the exhaust of the first and second particulate residue air streams from the second, exhaust end of the air plenum.

These and other aspects of the present invention will be described in greater detail hereinafter.

BRIEF DESCRIPTION OF THE DRAWING

Preferred embodiments of the invention are described below with reference to the following accompanying drawing.

FIG. 1 depicts a fragmentary, transverse, vertical sectional view taken through a harvesting device, which shows the present invention positioned therein.

DETAILED DESCRIPTION OF THE PREFERRED EMBODIMENT

This disclosure of the invention is submitted in furtherance of the constitutional purposes of the U.S. Patent Laws "to promote the progress of science and useful arts" (Article 1, Section 8).

A particulate residue separator in accordance with the teachings of the present invention is generally indicated by the numeral 10 in FIG. 1. As seen therein, the particulate residue separator 10 includes an air plenum 11, which is made integral with a harvesting device 12, such as a combine of conventional design. The air plenum 11 has a first, intake end 13 and an opposite, second, exhaust end 14. Additionally, the particulate residue separator 10 includes a baffle 15 that is positioned within the air plenum 11 and located at the second, exhaust end 14 thereof. Still further, it will be understood that the harvesting device 12 includes a biomass intake region 20, which is located above and near the first, intake end 13 of the air plenum 11. Those skilled in the art will recognize that a biomass such as wheat, corn, or the like, that is being harvested will pass through the biomass intake region 20 and will then be processed, or acted upon by rotors, cylinders or similar assemblies (not shown) in order to separate the crop from the related stems, leaves and other materials associated with the crop. In the case of wheat, for example, the wheat would be received within the biomass intake region 20, and then the harvesting device 12 would convert the crop into first and second particulate residue fractions 21 and 22 (i.e., chaff and straw, respectively). A first particulate residue intake 23 would receive, for example, the first particulate residue fraction 21 (i.e., chaff), which would enter the air plenum 11 along a surface of the first particulate residue intake 23. This first particulate residue fraction 21 would then enter into the air plenum 11 and subsequently travel in the direction of the second, exhaust end 14. Still further, a second particulate residue intake 24 is provided, which would receive the second particulate residue fraction 22 (i.e., straw). Again the second particulate residue fraction 22 would enter the air plenum 11 at a location that is generally downstream of the first particulate residue intake 23 and travel in the direction of the second, exhaust end 14 of the air plenum 11.

As seen in FIG. 1, an outside air intake 30 is provided. A fan assembly 35, shown by a dashed line, and which is borne by the harvesting device 12, would blow the outside air upwardly into the plenum 11 so that the outside air would travel in the direction of the second, exhaust end 14. Movement of outside air through the outside air intake 30 and into the plenum 11 creates or forms first and second particulate residue air streams 31 and 32, respectively, which predominantly carry the first and second particulate residue fractions 21 and 22 in the direction of the second, exhaust end 14.

As will be seen from FIG. 1, a particulate residue separator 10 for a harvesting device 12 includes an air plenum 11 borne by the harvesting device 12, which has a first, intake end 13 and a second, exhaust end 14; first and second particulate residue air streams 31 and 32, which are formed by the harvesting device 12 and that travel, at least in part, along the air plenum 11 in the direction of the second, exhaust end 14; and a baffle 15, which is located in partially occluding relation relative to the air plenum 11 and that substantially separates the first and second particulate residue air streams 31 and 32, respectively, at the second, exhaust end 14. As seen in FIG. 1, the baffle 15 is located within and near the second, exhaust end 14 of the air plenum 11, which further generally extends in the direction of the first, intake end 13 of the air plenum 11. As earlier discussed, the preponderance of the first particulate residue air stream 31 in the arrangement, as seen in FIG. 1, may comprise a first particulate residue fraction 21 (i.e., chaff), and the preponderance of the second particulate residue air stream 32 may comprise a second particulate residue fraction 22 (i.e., straw). As seen in FIG. 1, the second, exhaust end 14 of the air plenum 11 has a width dimension, and it should be understood that the baffle 15 has a width dimension that is less than about the width dimension of the air plenum 11 when it is measured at the second, exhaust end 14 thereof. It will be appreciated by a study of FIG. 1 that the baffle 15 is oriented within the air plenum 11 so as to substantially eliminate mixing of the first and second particulate residue air streams 31 and 32 at the second, exhaust end 14 thereof, and further does not substantially impede the movement of the first and second particulate residue air streams 31 and 32. Still further, and as will be appreciated from the previous discussion, the harvesting device 12 has a harvesting function that is well known in the art, and the baffle 15 is mounted in such an orientation whereby the baffle 15 does not substantially impede the harvesting function of the harvesting device 12. In one form of the invention, the baffle 15 has a width dimension of at least about 52 inches to about 56 inches, and further has a length dimension that is less than about one-half the length dimension of the air plenum 11. As seen in FIG. 1, the baffle 15 has a first major portion 33 and a second minor portion 34 that is oriented in an acute, angulated orientation relative to the first major portion 33. Additionally, the first major portion 33 and the second minor portion 34 each have a length dimension, wherein the length dimension of the second minor portion 34 of the baffle 15 is less than about one-half the length dimension of the first major portion 33. As seen in FIG. 1, the second minor portion 34 has the effect of deflecting, at least in part, the second particulate residue air stream 32 as it departs from the second, exhaust end 14 of the air plenum 11. It should be understood that the first major portion 33 and the second minor portion 34 of the baffle 15 may be substantially planar or, further, may be nonplanar, depending upon the harvesting device 12 upon which the baffle 15 is deployed. Still further, the baffle 15 may be fabricated as a porous or nonporous structure.

The present invention also relates to a method for separating a particulate residue stream, which broadly includes the steps of providing a harvesting device 12 that has an air plenum 11, wherein the air plenum 11 has a first, intake end 13 and a second, exhaust end 14; generating a first particulate residue air stream 31 and a second particulate residue air stream 32 within the air plenum 11, which move in the direction of the second, exhaust end 14; and positioning a baffle 15 near the second, exhaust end 14 and within the air plenum 11 so as to maintain the first and second particulate residue air streams 31 and 32 substantially separated upon discharge from the air plenum 11. As should be understood, the step of positioning the baffle 15 near the second, exhaust end 14 of the air plenum 11 further comprises a step of orienting the baffle 15 so as to not substantially impede the first and second particulate residue air streams 31 and 32 at the second, exhaust end 14 of the air plenum 11. Still further, the method of the present invention includes a step of providing a rigid substrate and forming the baffle 15 from the rigid substrate, which is dimensioned so as to be received within the air plenum 11, and which is further located between the first and second particulate residue air streams 31 and 32. As earlier discussed, the baffle 15 may be substantially planar or nonplanar and, further, the baffle 15 may be, at least in part, porous or nonporous depending upon the design of the harvesting device 12.

More specifically, the method for separating a particulate residue of the present invention includes the steps of providing a crop or biomass to be harvested; providing a harvesting device 12, which has at least one air plenum 11 and generates first and second particulate residue air streams 31 and 32, wherein the first and second particulate residue air streams 31 and 32 have discrete particulate residue fractions 21 and 22, respectively, and wherein the at least one air plenum 11 has a first, intake end 13 and a second, exhaust end 14. The method of the present invention further includes a step of harvesting the crop or biomass that enters into a biomass intake region 20 of a harvesting device 12 while simultaneously producing the first and second particulate residue fractions 21 and 22 during the harvesting of the crop. The method includes another step of propelling the respective first and second particulate residue fractions 21 and 22, at least in part, along the air plenum 11 by means of the first and second particulate residue air streams 31 and 32 and in a direction of the second, exhaust end 14. Still further, the method includes another step of maintaining separation of the first and second particulate residue air streams 31 and 32 at the second, exhaust end 14 of the air plenum 11 and collecting the respective first and second particulate residue fractions 21 and 22 from the first and second particulate residue streams 31 and 32 for further processing following exhaust of the first and second particulate residue air streams 31 and 32 from the second, exhaust end 14 of the air plenum 11. As earlier discussed, the step of positioning the baffle 15 in the air plenum 11 at the second, exhaust end 14 thereof further includes a step of orienting the baffle 15 within the air plenum 11 so as to not substantially impede movement of the first and second particulate residue air streams 31 and 32 along the air plenum 11 and to further not substantially effect a harvesting function of the harvesting device 12. In the arrangement as seen in FIG. 1, the baffle 15 has a width dimension of greater than about 52 inches. Still further, after the step of collecting the respective first and second particulate residue fractions 21 and 22, the method includes another step of generating ethanol by the use of at least one of the collected first and second particulate residue fractions 21 and 22.

OPERATION

The operation of the described embodiment of the present invention is believed to be readily apparent and is briefly summarized at this point.

A particulate residue separator 10 and a method for separating particulate residue are described herein. As seen in FIG. 1, the particulate residue separator 10 is made integral with a harvesting device 12, which performs a harvesting function and produces a particulate residue stream that has at least a first particulate residue fraction 21 and a second particulate residue fraction 22 as a result of the harvesting function. The apparatus seen in FIG. 1 includes an air plenum 11 borne by the harvesting assembly 12, which has a first, intake end 13, a second, exhaust end 14, and a given length dimension. The particulate residue separator 10, as seen in FIG. 1, includes a means borne by the harvesting assembly 12 for forming and propelling the first and second particulate residue fractions 21 and 22 into first and second particulate residue air streams 31 and 32, respectively, which travel, at least in part, along the air plenum 11 in the direction of the second, exhaust end 14. A baffle 15 is mounted within the air plenum 11 and is further located at the second, exhaust end 14 thereof. The baffle 15 has a length dimension that is less than about one-half the length dimension of the air plenum 11, which is further oriented relative to the air plenum 11 such that it does not substantially impede the movement of the first and second particulate residue air streams 31 and 32 while simultaneously maintaining the separation of the first and second particulate residue air streams 31 and 32 at the second, exhaust end 14 (i.e., a discharge end) of the air plenum 11. The baffle 15 further does not impede the harvesting function of the harvesting device 12

Therefore it will be seen that the present invention provides a convenient means whereby residue streams produced as a result of a harvesting function of a harvesting device can be utilized in downstream processes to produce value-added products not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A method of separating a particulate residue stream, comprising:

directing a first particulate residue comprising chaff into a first particulate residue intake of a first, intake end of an air plenum of a harvesting device;

directing a second particulate residue comprising straw into a second particulate residue intake of the first, intake end of the air plenum, downstream from the first particulate residue intake;

directing outside air through an outside air intake, upstream from the first particulate residue intake, to form a first particulate residue air stream comprising the first particulate residue and a second particulate residue air stream comprising the second particulate residue within the air plenum moving in the direction of a second, exhaust end of the air plenum; and directing the first particulate residue air stream and the second particulate residue air stream past an angulated baffle comprising a first major portion and a second minor portion near the second, exhaust end, and within the plenum so as to maintain the first particulate residue of the first particulate residue air stream and the second particulate residue of the second particulate residue air stream substantially separated upon discharge from the plenum for the separate collection thereof, and not directed to a spreader or chopper for spreading on the ground, but rather to facilitate the separate collection of the first particulate residue and the second particulate residue for further processing of at least one of the first particulate residue and the second particulate residue.

2. The method of claim 1, further comprising directing the first particulate residue air stream and the second particulate residue air stream past the angulated baffle without substantially impeding the first and second particulate residue air streams at the second end of the plenum.

3. The method of claim 1, wherein directing the first particulate residue air stream and the second particulate residue air stream past an angulated baffle further comprises directing the first particulate residue air stream and the second particulate residue air stream past an angulated baffle formed from a rigid substrate.

4. The method of claim 3, wherein directing the first particulate residue air stream and the second particulate residue air stream past an angulated baffle further comprises directing the first particulate residue air stream and the second particulate residue air stream past an angulated baffle comprising a substantially planar region.

5. The method of claim 3, wherein directing the first particulate residue air stream and the second particulate residue air stream past an angulated baffle further comprises directing the first particulate residue air stream and the second particulate residue air stream past an angulated baffle that is nonplanar.

6. The method of claim 3, wherein directing the first particulate residue air stream and the second particulate residue air stream past an angulated baffle further comprises directing the first particulate residue air stream and the second particulate residue air stream past an angulated baffle that is, at least in part, porous.

7. The method of claim 3, wherein directing the first particulate residue air stream and the second particulate residue air stream past an angulated baffle further comprises directing the first particulate residue air stream and the second particulate residue air stream past an angulated baffle that is nonporous.

* * * * *

UNITED STATES PATENT AND TRADEMARK OFFICE
CERTIFICATE OF CORRECTION

PATENT NO.           : 7,918,721 B2
APPLICATION NO.      : 12/777670
DATED                : April 5, 2011
INVENTOR(S)          : Reed L. Hoskinson et al.

Page 1 of 1

It is certified that error appears in the above-identified patent and that said Letters Patent is hereby corrected as shown below:

| | | |
|---|---|---|
| COLUMN 1, | LINE 4, | change "RELATION" to --RELATED-- |
| COLUMN 1, | LINE 8, | change "pending," to --now U.S. Patent 7,744,450, issued June 29, 2010,-- |
| COLUMN 1, | LINES 23/24, | change "stream, and more particularly to" to --stream and, more particularly, to-- |
| COLUMN 1, | LINE 36, | change "processes such" to --processes, such-- |
| COLUMN 1, | LINE 37, | change "feed; or" to --feed, or-- |
| COLUMN 1, | LINE 44, | change "showed that that the" to --showed that the-- |
| COLUMN 1, | LINE 49, | change "significant, and further has" to --significant and, further, has-- |
| COLUMN 2, | LINE 5, | change "streams is" to --streams are-- |
| COLUMN 3, | LINE 13, | change "the invention" to --the present invention-- |
| COLUMN 3, | LINE 63, | change "line, and which" to --line, which-- |
| COLUMN 3, | LINE 65, | change "the plenum" to --the air plenum-- |
| COLUMN 3, | LINE 67, | change "the plenum" to --the air plenum-- |

Signed and Sealed this

Twentieth Day of December, 2011

David J. Kappos
*Director of the United States Patent and Trademark Office*